W. T. PHILLIPS.
ROACH TRAP.
APPLICATION FILED JULY 10, 1916.

1,250,007.

Patented Dec. 11, 1917.

Witness.
R. K. Stevens.
P. M. Hunt.

Inventor
W. T. Phillips.
By John Louis Waters & Co.
Attorney.

UNITED STATES PATENT OFFICE.

WILLIAM T. PHILLIPS, OF TAMPA, FLORIDA.

ROACH-TRAP.

1,250,007.   Specification of Letters Patent.   Patented Dec. 11, 1917.

Application filed July 10, 1916. Serial No. 108,420.

*To all whom it may concern:*

Be it known that I, WILLIAM T. PHILLIPS, a citizen of the United States, residing at Tampa, in the county of Hillsborough and State of Florida, have invented certain useful Improvements in Roach-Traps, of which the following is a specification, reference being had therein to the accompanying drawing.

This invention relates to improvements in roach traps, one object of the invention being the provision of a trap of this type which is provided with roach inlet portions which permits of the free ingress of the roach, but prevents the egress thereof, each inlet consisting of a wire net member projected into the captivity chamber at an incline above the bottom thereof so that such inlet opening is not easily found after the roach once enters the captivity chamber.

A further object of this invention is the provision of a trap of this type which is simple, durable and inexpensive in construction and is thoroughly efficient and practical in use.

In the accompanying drawings:—

Figure 1:
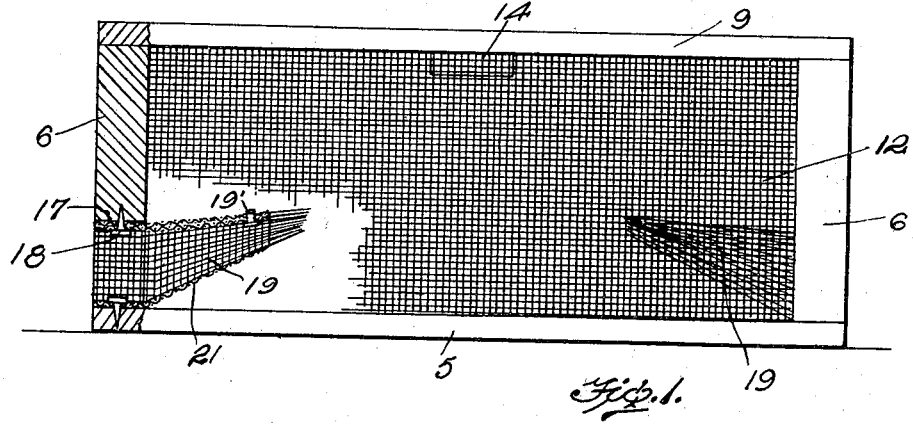
Figure 1 is a side elevation of the complete trap, one wall of the same being broken away to show the interior construction.
Figure 2:
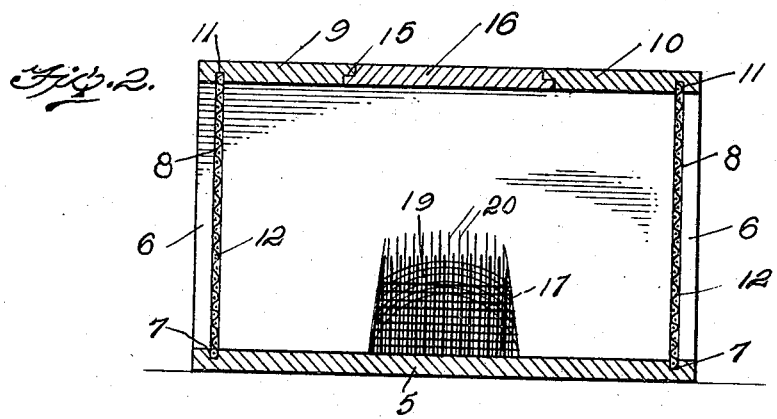
Fig. 2 is a transverse section through the trap adjacent one end thereof.

Referring to the drawings, the numeral 5 designates the bottom of the trap which has attached thereto the two end walls 6.

Two longitudinal grooves 5 are formed adjacent the edges of the bottom upon the upper surface thereof, while upon the inner surface adjacent the end walls 5 are the grooves 8.

Two strips 9 and 10 are attached to the upper edges adjacent the end walls, and each is provided with a groove 11. The two strips 12 of wire mesh at the respective edges thereof are seated within the grooves at the bottom, end, and top members, being firmly held therein by the connection of such members together, while the two strips 9 and 10 are secured by means of the transverse strip 14 attached to the inner side thereof.

The inner edges of the strips 9 and 10 are beveled as at 15, so that the sliding strip 16, which is dove-tailed in cross section, may fit snugly therein to be removed from either end to permit of the insertion of the bait and the removal of the roaches.

Each end wall is provided with a substantially semi-circular opening 17 which has attached thereto by means of the fastening device 18 the roach inlet 19.

This inlet member is made of wire mesh rolled in a form to correspond at the inlet end to the shape of the opening 17 and attached together by means of the malleable fastening 19, the longitudinal strands 20 of such inlet member being free at their inner ends and providing a means to hide the inlet opening of the member so that after the roaches have once passed beyond such free ends into the captivity chamber of the trap, it is practically impossible for a roach to find the opening to escape, while the free terminals of the longitudinal strands of such inlet member act as a means to prevent the entrance of the roach.

The lower portion 21 of each inlet member is flat and inclined so as to project the exit end of the same above the bottom of the captivity chamber.

Figure 3:
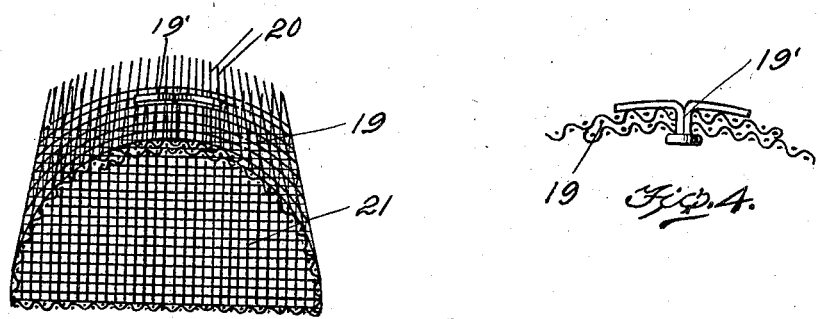
Figs. 3 and 4 are detail views of one of the inlet funnels.
Figure 4:
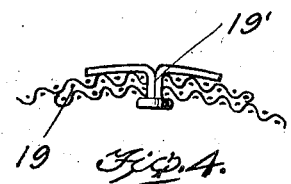

Upon reference to Fig. 3 it will be observed that insect inlet members are semi-cylindrical in cross section and are arranged in a tapered form toward their outer free end. The removable malleable fasteners 19' permit of the adjustment of the outer portion of each of these members if desired.

In using the present trap, the cover 16 is removed and the desired bait is placed upon the bottom within the captivity chamber, and the trap then positioned so that the roaches may enter the respective openings 17.

When it is desired to release the captive roaches, the cover 16 is removed and such roaches dumped out by inverting the trap or shaking the same.

What I claim as new is:—

In a device of the kind described, in combination a box having a semi-circular opening formed in one wall in a plane with the bottom thereof, and an inlet member formed of a sheet of wire mesh material rolled into a substantially segmental form, one end of said inlet member being snugly secured against the edges of said semi-circular opening, and the main body portion thereof converging forwardly and at an upward inclination with respect to the portion secured in the opening of said box, the edges of the converging portion of the wire mesh material of said inlet member being arranged to overlap, and a split pin having its sides bent back so as to join the last mentioned overlapping sides of said inlet member.

In testimony whereof I affix my signature.

WILLIAM T. PHILLIPS.

Copies of this patent may be obtained for five cents each, by addressing the "Commissioner of Patents, Washington, D. C."